March 11, 1969  A. F. KOPASKA  3,431,942
HYDRAULIC COUPLER
Filed Feb. 23, 1966  Sheet 1 of 3
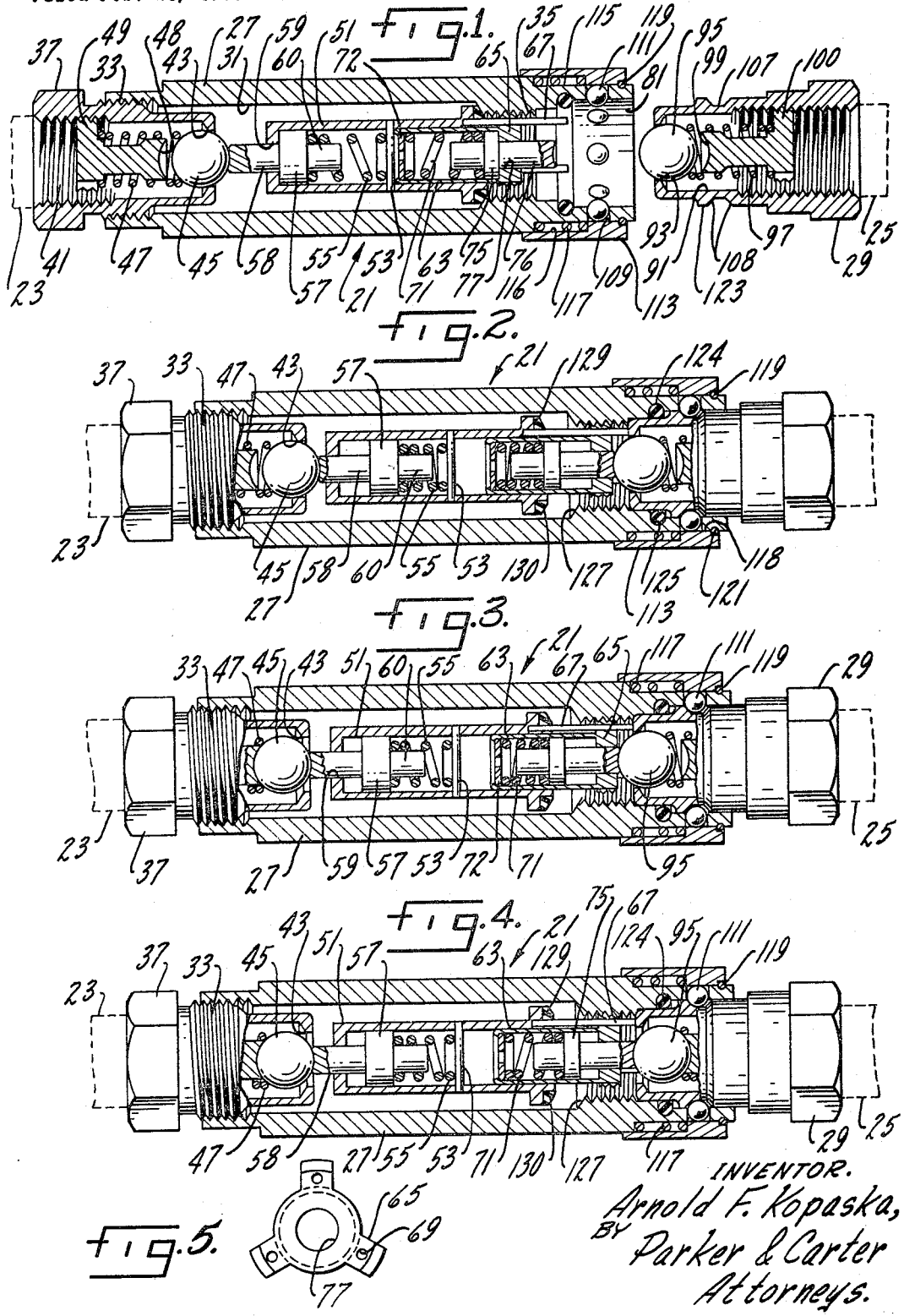
INVENTOR.
Arnold F. Kopaska,
BY Parker & Carter
Attorneys.

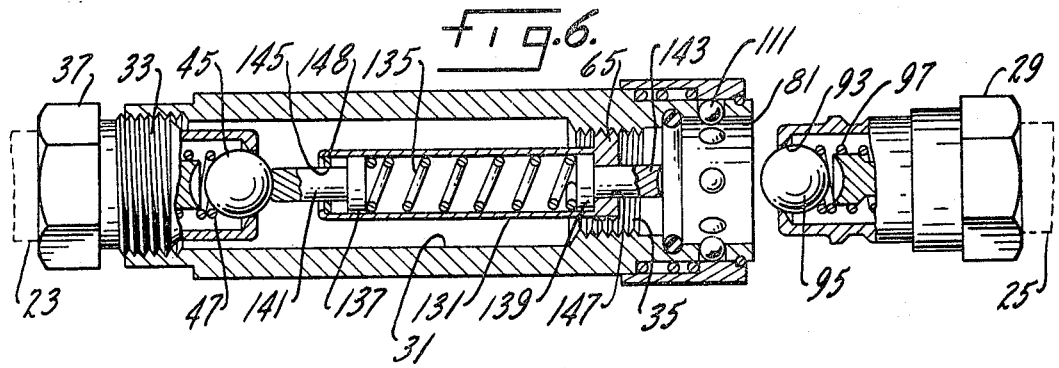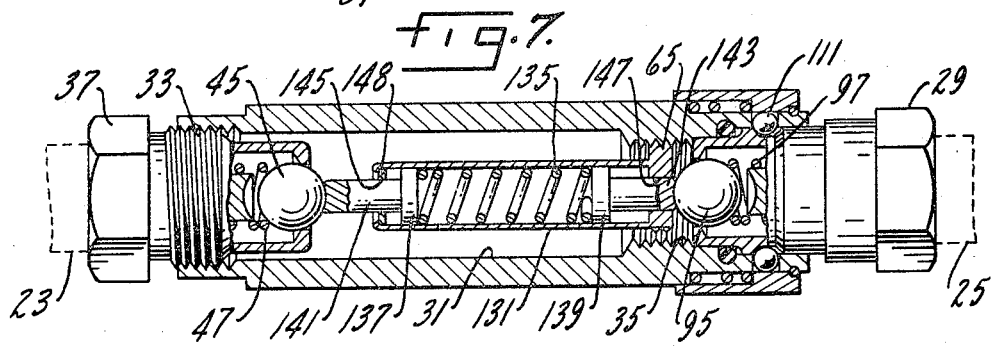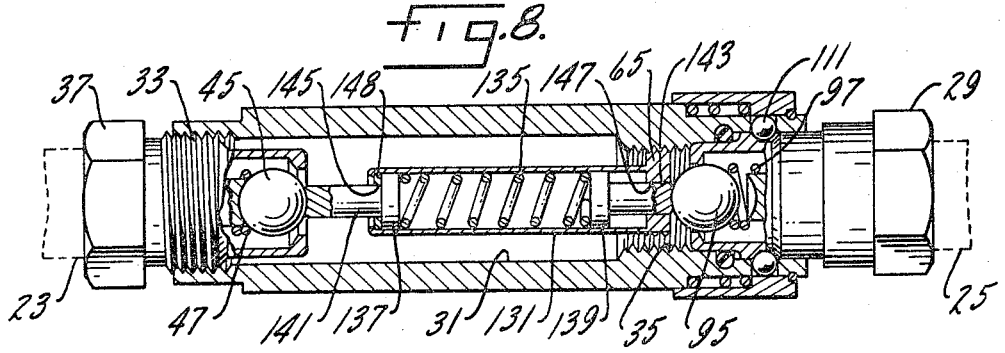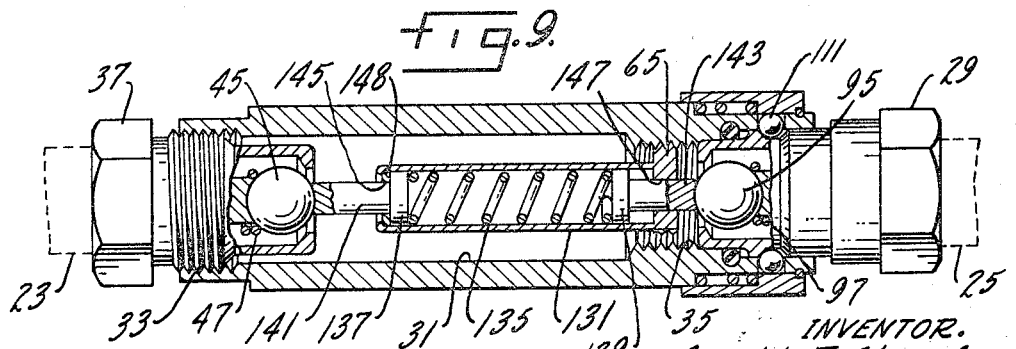

March 11, 1969  A. F. KOPASKA  3,431,942
HYDRAULIC COUPLER
Filed Feb. 23, 1966
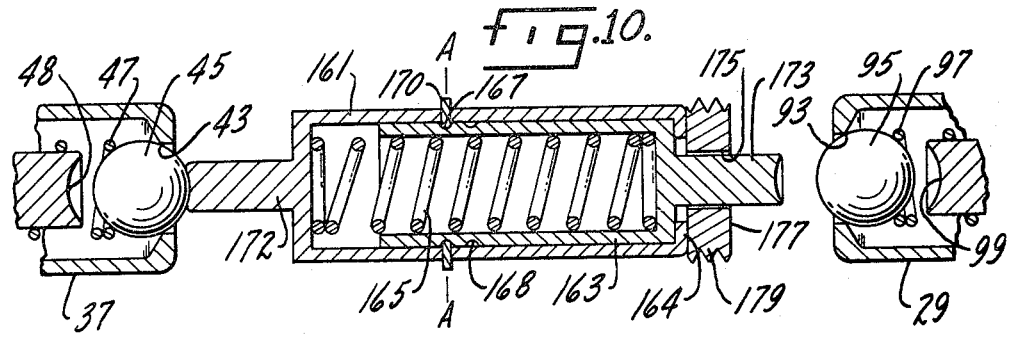
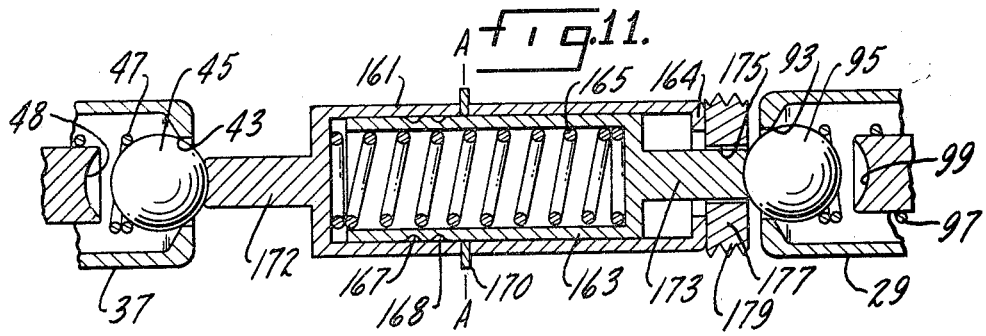
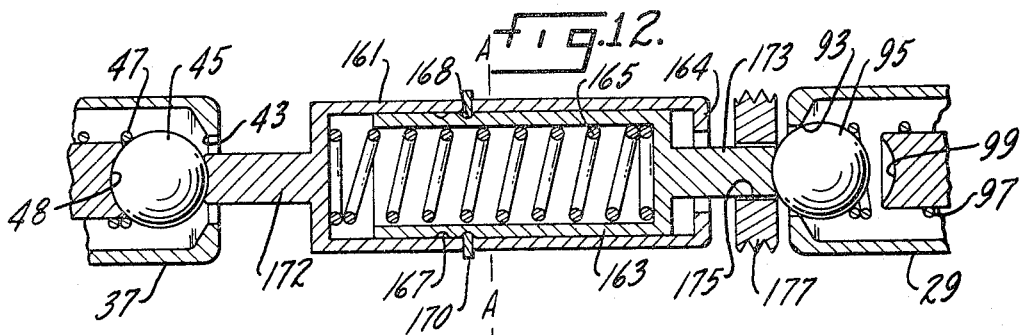
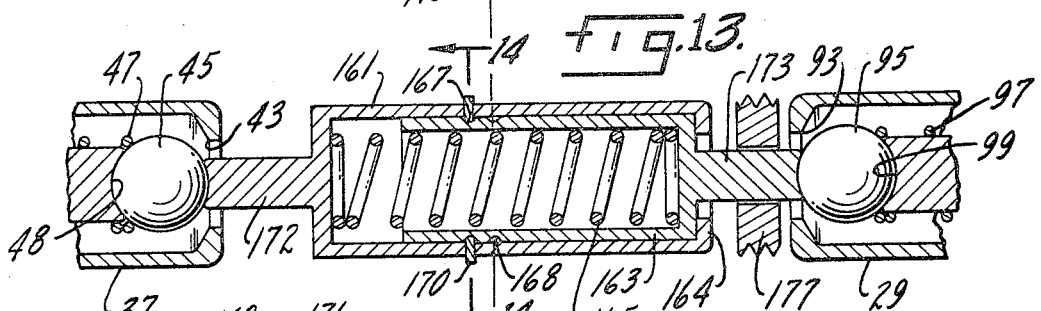
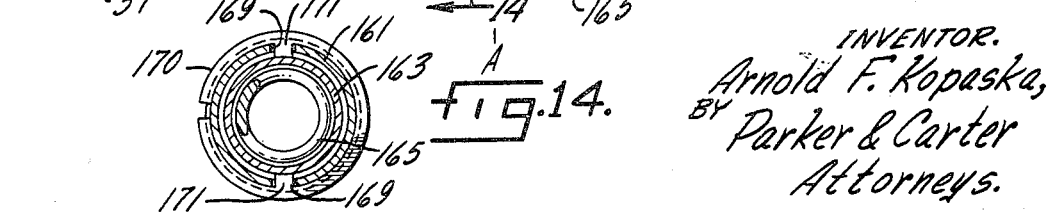
INVENTOR.
Arnold F. Kopaska,
BY Parker & Carter
Attorneys.

United States Patent Office 3,431,942
Patented Mar. 11, 1969

3,431,942
HYDRAULIC COUPLER
Arnold F. Kopaska, Rte. 4, Guthrie Center, Iowa 50115
Filed Feb. 23, 1966, Ser. No. 529,322
U.S. Cl. 137—614.05    10 Claims
Int. Cl. F16l 29/00, 37/22, 37/28

ABSTRACT OF THE DISCLOSURE

A coupler for releasably connecting a pair of conduits one or both of which may contain hydraulic fluid under pressure. The coupler includes a male body member connected to one conduit and a female body member connected to the other conduit. A releasable locking means is provided for holding the body members together in a telescoping relationship. Each body member has a spring biased closing ball check valve as part thereof. A pressure exerting means is located in the female body member and is adapted to exert an unseating force against each ball check valve when the body members are coupled together which force is greater than the seating force exerted against a ball check by its spring but less than the sum of the seating forces exerted against the ball check by its spring and by the pressurized fluid in its conduit so that when the fluid pressure in its conduit is reduced, the pressure producing means will open the ball check and hold it open.

This invention relates to a coupler for connecting and disconnecting hydraulic fluid conduits.

An object of this invention is a coupler which can be connected and disconnected when one or both of the conduits contain hydraulic fluid under pressure.

Another object is a hydraulic coupler which can be separated under pressure with a minimum loss of hydraulic fluid.

Another object is a hydraulic coupler which maintains the hydraulic systems isolated even though the couplers are connected together until the pressure is reduced momentarily in one side of the system.

Other objects may be found in the following specification, claims and drawings.

The invention is illustrated more or less diagrammatically in the following drawings wherein:

FIGURE 1 is a longitudinal central sectional view through a coupler of the invention, showing the general parts of the coupler just before engagement of the tubular body members;

FIGURE 2 is a view similar to FIGURE 1, but showing the tubular body members connected;

FIGURE 3 is a view similar to FIGURE 2, but showing the valve element of one of the tubular body members in its open position;

FIGURE 4 is a view similar to FIGURE 2, but showing both of the valve elements of the tubular body members in their open positions;

FIGURE 5 is an end view of an element of one of the tubular body members;

FIGURE 6 is a longitudinal central sectional view through a coupler embodying a modification of the invention and showing the coupler just before engagement of the tubular body members;

FIGURE 7 is a view similar to FIGURE 6, but showing the tubular body members connected;

FIGURE 8 is a view similar to FIGURE 7, but showing the valve element of one of the tubular body members in its open position;

FIGURE 9 is a view similar to FIGURE 7, but showing both of the valve elements of the tubular body members in their open positions;

FIGURE 10 is a longitudinal central sectional view through a coupler embodying yet another modification of the invention and showing the coupler just before engagement of the tubular body members with portions of the coupler removed for clarity of illustration;

FIGURE 11 is a view similar to FIGURE 10, but showing the tubular body members connected;

FIGURE 12 is a view similar to FIGURE 11, but showing the valve element of one of the tubular body members in its open position;

FIGURE 13 is a view similar to FIGURE 11, but showing both of the valve elements of the tubular body members in their open positions; and FIGURE 14 is a cross-sectional view taken along line 14—14 of FIGURE 13.

Referring now to the drawings, in which like parts are designated by like members throughout, and particularly to FIGURES 1 through 5 in which a hydraulic coupler 21 is adapted to connect a pair of conduits 23 and 25, one of which, in this instance conduit 23, is connected to a source of hydraulic power, such as a pump (not shown), and the other conduit 25, is connected to an implement (not shown), which is operated by the hydraulic fluid power. The coupler may include a female body member 27 attached to the conduit 23 and an interfitting male body member 29 connected to the hydraulic conduit 25. The female body member 27 may be tubular having a longitudinal bore 31 extending throughout its length. Portions of the bore adjacent the ends thereof may be threaded internally at 33 and 35 with the threaded portion 33 adapted to receive an exteriorly threaded tubular member 37.

The tubular member 37 is shown with an interior partially threaded bore 41 reduced diametrically at one end thereof to form an annular seat 43. A valve element, in this case a ball 45, is located in the bore 41 and is urged into fluid sealing relationship with the annular seat 43 by a resilient compression spring 47. A stop 48 is provided to limit movement of the ball 45 away from the seat 43. The stop 48 may be equipped with threaded spokes 49 adapted to engage the threaded portion of the bore 41 to adjustably position the stop relative to the annular seat and to vary the compression of the spring 47 against the ball. When the ball 45 is in fluid sealing relation with the annular seat 43, a portion of it will protrude through the annular seat and into the bore 31 of the tubular member 27.

A tube 51 of exterior diameter smaller than that of the bore 31 is positioned in the bore. This tube is divided longitudinally by means of a pin 53 extending therethrough. A coil spring 55 is positioned in the tube on one side of the pin and bears against the pin and against a plunger 57 inserted in the tube adjacent one end thereof. The plunger 57 is generally cylindrical having a portion 58 of reduced diameter at one end thereof. To retain the plunger in the tube, said end of the tube is provided with an opening 59 of smaller diameter than that of the tube or plunger which will permit passage only of the reduced portion 58 of the plunger. The opposite end of the plunger also has a portion 60 of reduced diameter which telescopes into the coil spring 55.

Positioned in the tube 51 on the opposite side of the pin 53 is another tube 63 having a plurality of threaded spokes 65 located at one end thereof and which are adapted to engage the threaded portion 35 of the bore 31. A plurality of longitudinally extending rods 67, in this case one for each spoke 65, are fastened to the exterior of the tube 51 and extend beyond the end thereof to pass through openings 69 in the spokes to hold the tubes 51 and 63 in alignment and to help support the tube 51 in the bore 31. A coil spring 71 is located in the tube 63 and bears against a closed end 72 of the tube which is located opposite to the spoke end thereof. The spring 71 also bears against a plunger 75 positioned at the spoke end of the tube. The plunger 75 is generally cylindrical and has a portion 76 of reduced diameter at one end thereof. An opening 77 of smaller diameter than the tube 63 is provided at the spoke end thereof to slidably receive the reduced portion 76 of the plunger 75. With the tube 63 positioned in the tube 51, the reduced portion 76 of the plunger extends beyond the spoke end of the tube to a location just short of the free ends of the rods 67. The tubes 51 and 63 can be positioned in the bore 31 so as to locate the plunger reduced portion 76 and the ends of the rods 67 in the enlarged portion 81 of the bore.

The male body member 29 is tubular in shape with an interior partially threaded bore 91 which is reduced diametrically at one end to form an annular valve seat 93. A valve element, in this case a ball 95, is located in the bore and is urged into fluid sealing relationship with the annular seat by a resilient compression spring 97. A stop 99 is provided to limit movement of the ball away from the valve seat 93. The stop may be equipped with threaded spokes 100 adapted to engage the threaded portion of the bore 91 to adjustably position the stop relative to the annular seat and to vary the compression of the coil spring 97 against the ball. When the ball 95 is in fluid sealing relation with the annular seat 93, a portion of it will protrude through the annular seat and beyond the seat end of the male body member 29.

Means are also provided for releasably holding the male body member 29 and the female body member 27 in coupled relationship. The male body member 29 is provided with an external annular groove 107 located rearwardly from its annular valve seat end. This annular groove has outwardly diverging walls 108 and is positioned so as to be in registry with a plurality of radial apertures 109 located in the enlarged portion 81 of the bore 31 of the female body member 27. The apertures 109 loosely accommodate an equal number of small detent balls 111 which are at all times at least partially and slidably overridden by a retaining collar 113 which is slidably mounted over a reduced diameter portion 115 of the female body member 27. Retaining collar 113 is chambered out at 116 to slide over the larger diameter of the body member 27 and to also accommodate a coil spring 117 which urges the retaining collar to the right as viewed in the drawings, with the outer extremity 118 of the collar always at least partially overlying and retaining the detent balls 111 in place. To connect body member 27 and 29, collar 113 is manually urged to the left to permit the detent balls 111 to be displaced outwardly and radially for accommodation of the male body member 29 within the enlarged bore 81 of the female body member. Movement of the collar 113 to the right is limited to the position shown in FIGURE 1 by a snap ring 119 which is seated in an external groove 121 on the reduced outer diameter portion 115 of the female body member 27. Located ahead of the annular groove 107 on the male body member 29 is an annular shoulder 123 which engages the detent balls 111 just prior to the locking of the two body members 27 and 29. An O-ring 124 seated in a groove 125 acts as a fluid seal between the male body member and the female body member when coupled.

An annular shoulder 127 is positioned on the inside of the bore 31 of the female body member 27 adjacent the threaded portion 35 thereof. Another annular shoulder 129 is formed on the outside of the tube 51. A fluid sealing ring 130 fits over the tube 51 against the annular shoulder 129. When the tube 51 is in the posiiton shown in FIGURE 1, the sealing ring 130 will be compressed in contact with both of said shoulders to prevent the leakage of hydraulic fluid from the bore 31.

In the modified embodiment of the invention shown in FIGURES 6 through 9 inclusive, the telescoping tubes 51 and 63 of the preferred embodiment of the invention are replaced by a single tube 131 having threaded spokes 65 at one end thereof adapted to engage the internal threaded portion 35 of the bore 31 of the female body member 27. Located inside this tube is a coiled compression spring 135 which is free to be moved longitudinally in the tube and exerts pressure against plungers 137 and 139 located at opposite ends thereof. The plungers are cylindrical in shape and each have a portion of reduced diameter, designated as 141 on plunger 137 and 143 on plunger 139, at one of their ends. The reduced portions of the plungers extend outwardly of the tube and respectively through openings 145 and 147 formed in the opposite ends of the tube. The opening 145 is formed in a washer 148 crimped in place at one end of the tube and the opening 147 is formed in the spoke portion at the opposite end of the tube.

When the tube 131 is positioned in the bore 31 by means of engagement of its threaded spokes 65 with the threaded portion 35 of the bore, the plunger 137 will be positioned with its reduced end portion 141 contacting the protruding portion of the check valve ball 45. The reduced end portion 143 of plunger 139 will be positioned so as to extend slightly into the enlarged portion 81 of the bore 31. The other parts of this modified structure, shown in FIGURES 6 through 9, are similar to those shown in the preferred form of the invention.

In yet another modified embodiment of the invention shown more or less diagrammatically in FIGURES 10 through 14, inclusive, a pair of telescoping tubes 161 and 163 are adapted to fit in the bore 31 of the female body member 27. Most parts of the female body member have been omitted in these figures for clarity. The tubes enclose a coil spring 165, which urges the tubes apart. Separation of the tubes is prevented by engagement of a turned-in end portion 164 of tube 161 with the tube 163. One of the tubes, in this instance the inside tube 163, is provided with spaced annular outwardly opening grooves 167 and 168. The other tube is constructed with spaced radial openings 169. A split ring 170 having detents 171 adapted to extend through said radial openings to engage said grooves in the outer surface of tube 163 to hold the tubes in various positions of spaced longitudinal relationship fits over said outer tube. Tube 161 has a plunger-like closed end 172 of reduced diameter which is adapted to engage ball 45. Tube 163 has a plunger-like closed end 173 of reduced diameter which is adapted to pass through an opening 175 in a collar 177. The collar has threaded spokes 179 which are adapted to engage the threaded portion 35 of the bore 31 to locate and position the tubes 161 and 163 in the bore. Closed end 173 is also adapted to be engaged by the protruding portion of ball 95 of the male body member 29 when the male and female body members are coupled.

The use, operation and function of this invention are as follows:

The hydraulic coupler 21 of the invention is particularly useful for connecting two hydraulic conduits, such as conduits 23 and 25, when both of these conduits contain hydraulic fluid under pressure. This condition can occur, for example, when one of the conduits is connected to a source for supplying hydraulic fluid under pressure and the other connected to an implement adapted to be actuated by the pressurized hydraulic fluid. Assume for purposes of illustration that the conduit 23 is connected to a pump and the conduit 25 is connected to an implement which will be actuated by the hydraulic fluid from the pump.

FIGURE 1 shows an emboidment of the invention prior to the connection of the female body member 27 and the male body member 29. In the uncoupled position of FIGURE 1, hydraulic pressure in the conduit 23 will act on the ball 45 in combination with the force exerted by the spring 47. The combined force acting on the ball 45 will be greater than the force exerted on this ball by the spring 55 acting through the plunger 57. Therefore, the ball 45 will be held in contact with its annular seat 43 and hydraulic fluid will not be admitted into the bore 31 of the female body member 27. The amount of force exerted on the ball 45 by the plunger 57 with a spring 55 of a preselected size will be determined by the location of the tube 51 relative to the ball 45. In operation, this tube will be positioned so that the force exerted on the ball 45 by the plunger 57 before coupling will be equal to or slightly greater than the force exerted on the ball by the spring 47, but less than the sum of forces exerted on the ball by the spring 47 and the normal hydraulic pressure in the conduit 23. The ball 95 in the male connection 29 will be held in place by a combination of the forces exerted by the spring 97 and the hydraulic pressure normally trapped in the conduit 25, when the implement is disconnected.

To connect the male body member 29 with the female body member 27, the retaining collar 113 is manually moved to the left as shown in the drawings to uncover the detent balls 109 to permit the shoulder 123 of the male connection to slide under these detent balls. Then the male member 29 may be inserted into the enlarged portion 81 of the bore 31 until it seats therein. Upon seating of the male body member, the detent balls 111 seat in the annular slot 107 in the male body member and the retaining collar 113 can be released to return under the influence of spring 117 to its normal position of compressing the detent balls to hold the male body member in coupled relation.

As the male body member 29 enters the female body member 27, the protruding portion of the ball 95 engages the free end of the reduced portion 76 of the plunger 75 moving it to the left and compressing spring 71. Also, the end of the male body member adjacent the annular seat 93 engages the ends of the longitudinally extending rods 67 fastened to the tube 51 and moves these rods and the tube 51 to the left as shown in the drawings to compress the spring 55 between the plunger 57 and the radially extending pin 53 to increase the amount of force exerted against the ball check valve 45. As a consequence of compressing the spring 71 in the tube 63, the amount of force exerted by the plunger 75 on the ball 95 is also increased. With the tube 51 moved to the left as shown in FIGURE 2, sealing ring 130 is moved away from shoulder 127 providing a path for fluid through the bore 31 of the female body members 27. However, there is no flow between the conduits 23 and 25 because the balls 45 and 95 remain in contact with their respective seats 43 and 93.

With the male and female body members coupled as shown in FIGURE 2, the operator can reduce pressure momentarily in the hydraulic conduit 23, reducing the force exerted against the ball 45 so that the force exerted by the spring 55 through the plunger 57 can overcome the force of the spring 47 and move the ball away from its seat 43 permitting the flow of hydraulic fluid through the seat into the bore 31 and into contact with the protruding portion of the ball 95 of the male body member 29. Movement of the ball away from the seat will be limited by the stop 48. As the hydraulic fluid fills the bore 31, the fluid pressure equalizes on both sides of the ball 45 so that it is held in the open position by the over balancing force of the spring 55. With the build-up of hydraulic pressure in the bore 31, the combination of the force exerted by this flued and the force exerted by the spring 71 will be greater than the combination of the force exerted on the ball 95 by the fluid in conduit 25 and the force exerted by the spring 97 thus unseating the ball 95 and establishing communication from the conduit 23 to the conduit 25 through the bore 31. Movement of the ball away from the seat will be limited by the stop 99.

The male body member can be disconnected from the female body member by manually moving the retaining collar 113 to the left and pulling the male body member to the right. As the male body member is disconnected, the ball 95 will be forced against its seat 93 by the spring 97 sealing off conduit 25. The spring 55 and hydraulic fluid pressure acting against the tube 51 will move the sealing ring 130 into contact with the shoulder 127 to seal off the bore 31 and prevent escape of the hydraulic fluid trapped in this bore. Also, as the spring 55 moves the tube 51 to the right, the force exerted on the ball 45 by the plunger 57 will be reduced so that the spring 47 can move the ball 45 against the annular seat 43, thus sealing off the hydraulic conduit 23. Upon complete removal of the male body member 29 from the bore 31, the tube 51 will move back to its postion shown in FIGURE 1.

The coupling of the modified form of the invention shown in FIGURES 6 through 9 inclusive, is accomplished in the same manner as described above. As the male body member 29 is inserted in the enlarged portion 81 of the bore 31 of the female member 27, the ball 95 engages the end of the plunger 143 moving it to the left as shown in the drawings to compress and move the spring 135. The compression and leftward movement of the spring 135 will increase the force exerted on the ball 45, but even with this increase the force exerted to unseat the ball will still be less than the combined force exerted against the ball by the hydraulic fluid in conduit 23 and the spring 47. With the male body member locked in coupling engagement with the female body member as shown in FIGURE 7, an unobstructed passage will be established through the bore 31 from the valve seat 43 to the valve seat 93. As pressure is momentarily reduced in the conduit 23, the force exerted against the ball by the spring 135 will overcome the force exerted by the spring 47 against this ball moving the ball away from its seat 43 and permitting hydraulic fluid to flow through the seat. The hydraulic fluid will fill the bore 31 to build up pressure against the ball 95. The combination of the hydraulic pressure and the spring force 135 against the ball 95 will cause this ball to unseat permitting unobstructed flow from the conduit 23 to the conduit 25. Since the hydraulic fluid will act on both sides of the balls 45 and 95, these balls will be held open and against their stops 48 and 99 as long as the male and female body members are coupled together.

Upon uncoupling of the male body member from the female body member, the spring 135 will be allowed to move to the position shown in FIGURE 6, and the amount of force exerted by this spring against the ball 45 will be decreased, permitting the combination of the forces of the hydraulic fluid and the spring 47 to seat the ball 45. As the male body member is removed from the female body member, the hydraulic fluid in the bore 31 will escape reducing the pressure in this bore and allowing the ball 45 to close rapidly. The closing of the balls 45 and 95 upon disconnecting of the hydraulic coupling is practically instantaneous so only the hydraulic fluid contained in the bore 31 will be lost.

The modified form of the invention shown in the drawings of FIGURES 10 to 14 inclusive, functions generally in the same manner as the previously described embodiments. For ease of illustration, only the operating mechanism located in the bore 31 of the female body member 27 is shown. In order to more clearly show the movement of the operating mechanism a base line A—A is indicated on the drawings and the movements of the parts of this mechanism relative to this base line will be described.

As the male body member 29 is moved into the enlarged portion 81 of the bore, the ball 95 engages the free end of the plunger 173 moving this plunger and its integral tube 163 to the left as shown in the drawings. When the male body member is fully coupled as shown in FIGURE 11, the tube 163 will be moved two spaces to the left of the base line A—A. Each space is equal to the distance between the centers of the grooves 167 and 168. As a result of movement of the tube 163, the detent 170 is forced out of the groove 167, over the groove 168 and into frictional engagement with the outer surface of the tube 163. With the tube 163 moved to the left in this manner, the coil spring 165 is compressed and moved to the left exerting an increased force on the ball 45. However, the combination of forces exerted by the spring 47 and the hydraulic pressure in conduit 23 will keep this ball seated against the increased force. When the hydraulic pressure is momentarily released in the conduit 25, the coil spring 165 acting through the tube 161 and plunger 172 will overcome the force of the spring 47 unseating ball 45. As this occurs, tube 161 will move one unit to the left of the base line A—A as shown in FIGURE 12 and detent 170 will seat in the groove 168.

Upon opening of the valve 45, hydraulic fluid will flow into the bore 31 and act on the ball 95. The combination of this hydraulic pressure along with the force of the spring 165 will unseat the ball 95 allowing hydraulic fluid to pass between the conduit 23 and the conduit 25. As ball 95 is unseated, the tube 163 will move one unit to the right of its position of FIGURE 12 moving the groove 167 back into engagement with the detent 170 as is shown in FIGURE 13. When the valve elements of the male and female body members are both open, the position of the groove 167 and the detent member 170 will be one unit to the left of the original base line A—A. When the male body member 29 is removed from the female body member 27, the force of the spring 47 will move the tubes to the right to their original position relative to the base line A—A.

The provision of the detent 170 and grooves 167 and 168 in the last described embodiment of the invention permits the use of a lighter spring 165 than would be possible if the detents and grooves were omitted. The provision of the detent and grooves requires the exertion of a greater initial pressure for a given spring size to move the telescoping tubes between their various overlapping positions. For example, when the male body member 29 is coupled with the female body member 27, an additional amount of force above and beyond the amount required to compress spring 165 is required to unseat the detent 170 from the groove 167. Also the detent provides some frictional resistance as it passes along the outer surface of the inside tube 163. Similarly a greater reduction in pressure in conduit 23 will be required before the tube 161 will move and pull the detent 170 into groove 168. Also, when pressure builds up in the bore 131, a slightly greater pressure will be required before the ball 95 is unseated.

The coupling mechanism of this invention will also permit the coupling of the conduits 23 and 25 when there is no pressure in one or both of these conduits. Consider the situation when there is no pressure in conduit 23. As the male body member 29 is moved into coupling relation with the female body member 27, the tube 51 will moved to the left as shown in the drawings. Because there is no pressure in conduit 23, and because the force exerted by the spring 55 through the plunger 57 is greater than the force exerted by the spring 47, the ball check valve 45 will be unseated against the stop 48 as the tube 51 is moved to the left. Thus, upon complete coupling of the male body member 29, the ball check 45 will be opened and communication established between the conduit 23 and the bore 31. When hydraulic pressure is introduced in the conduit 23 and builds up in the bore 31, the combination of the force of spring 71 and the force exerted by the hydraulic pressure will open the ball 95 in the conduit 25 in the same manner as previously described.

If hydraulic pressure is present in conduit 23, but not in conduit 25, the ball 95 will unseat as the male body member 29 is moved into coupling relation with the female body member 27. This occurs because the spring 71 acting on the plunger 75 in the female body member is stronger than the spring 97 of the male body member. Therefore, the ball 95 will unseat upon coupling. However, the ball check valve 45 will remain seated until pressure is momentarily reduced in the conduit 23. Upon reduction of pressure in conduit 23, the ball 45 will open permitting hydraulic fluid into the bore 31 and through annular seat 93 of the male body member since the ball check valve 95 is open.

The coupling between the male body member 29 and female body member 27, can also be made when there is no hydraulic pressure in either of the conduits 23 and 25. In this situation, upon movement of the male body member 29 into coupling relationship with the female body member 27, the check valve 95 of the male body member will be unseated by the spring pressure 71 and the check valve 45 of the female body member will be unseated by the spring pressure 55 as the tube 51 is moved to the left by the engagement of its rods 67 with the male body member 29. Therefore, upon complete coupling of the male and female body members, the valves 45 and 95 will be open permitting flow through the connection as soon as hydraulic pressure is introduced into conduit 23. The construction of this coupler permits the coupling of the male and female body members under all of the above described conditions.

I claim:
1. A coupling for releasably connecting and intercommunicating a pair of conduits, including:
   a pair of body members, one of which is connected to a conduit leading to means for supplying fluid under pressure and the other of which is connected to a conduit leading to a device to be powered by the pressurized fluid,
   means for releasably connecting said body members end to end in a telescoping relationship,
   said body members having longitudinal bores with opposed annular valve seats located in said bores and disposed in coaxially spaced relationship when said body members are connected,
   check valves in said body members each adapted to seat in fluid-tight relationship against its respective valve seat,
   resilient means positioned within said body members and urging said check valves against their respective seats, and
   means located in one of said body members and adapted upon connecting of said body members to exert an unseating force against each of the check valves which force is greater than the seating force exerted against each of said check valves by its resilient means but less than the sum of seating forces exerted against each of said check valves by its resilient means and by the pressurized fluid in its conduit.

2. The structure of claim 1 further characterized in that said unseating force exerting means includes spring means which is compressed and moved towards the valve seat of said fluid pressure supplying conduit body upon connecting of said body members.

3. The structure of claim 2 further characterized in that detent means are utilized to initially retard the compression, movement and expansion of said spring means.

4. The structure of claim 1 further characterized in that said unseating force exerting means includes a pair of spring means aligned end to end, one of which is compressed and moved towards the valve seat of said fluid pressure supplying conduit body member upon connecting of said body members and the other of which remains stationary upon said connecting of said body members but is compressed by the check valve of said other body member.

5. The structure of claim 2 further characterized in that said unseating force exerting means is located in said fluid pressure supplying conduit body member and is adapted to be engaged by the other body member and to be moved towards said valve seat of said pressure supplying conduit member to increase the compression of said spring means.

6. The structure of claim 1 further characterized in that said unseating force exerting means includes a first tube fixed in position in the bore of one of said body members and containing a spring means adapted to be compressed upon connecting of said body members and a second tube in said bore telescoped over said first tube and adapted to be moved towards the check valve of the fluid pressure supplying conduit body member upon connecting of said body members with a spring means in said second tube adapted to be compressed upon connecting of said body members.

7. The structure of claim 6 further characterized in that said second tube includes means adapted to be contacted by said other body member and to move said second tube towards the check valve of the fluid pressure supplying conduit body member upon connecting of said body members.

8. The structure of claim 7 further characterized in that sealing means are formed on said second tube and in the bore of the body member in which said second tube is positioned with said sealing means adapted to prevent fluid flow through said bore when said body members are unconnected and to permit fluid flow through said bore when said second tube is moved towards said check valve.

9. The structure of claim 2 further characterized in that said spring means is located inside a tube fixed in position in the bore of said fluid pressure supplying conduit body member and plungers are located in said tube at opposite ends of said spring means to contact said check valves upon connecting of said body members.

10. The structure of claim 3 further characterized in that said spring means is located within and exerts separating forces against both of a pair of telescoping tubes, grooves are formed in the outer surface of the inner of said tubes, detent means are associated with the outer of said tubes and adapted to engage the grooves and outer surface of said inner tube to restrain relative movement of said tubes.

References Cited

UNITED STATES PATENTS 3,348,575  10/1967  Simak _____ 137—614.05

FOREIGN PATENTS 197,436  5/1923  Great Britain.

WILLIAM F. O'DEA, *Primary Examiner.*

HOWARD M. COHN, *Assistant Examiner.*

U.S. Cl. X.R.

251—297

Notice of Adverse Decision in Interference

In Interference No. 97,318 involving Patent No. 3,431,942, A. F. Kopaska, HYDRAULIC COUPLER, final judgment adverse to the patentee was rendered June 30, 1971, as to claims 1, 2, 4, 5, 6, 7 and 8.

[*Official Gazette August 10, 1971*]